2,868,805

2-ALKENYL AND 2-ALKYNYL DERIVATIVES OF 5,6-DIHYDRO-4H PYRANS

Glen E. Arth, Cranford, and Lewis H. Sarett, Princeton, N. J., assignors to Merck & Co., Inc., Rahway, N. J., a corporation of New Jersey No Drawing. Application October 2, 1953
Serial No. 383,923

6 Claims. (Cl. 260—345.1)

This invention relates to pyrans. More particularly, this invention is concerned with novel pyran derivatives and intermediates and methods useful in the production of such compounds. In addition, this invention is directed to novel plastic materials which are produced by the polymerization of these novel pyran derivatives.

According to the present invention novel pyran derivatives are hereby provided having the structure

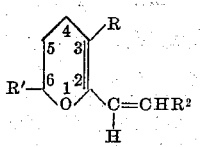

wherein R and R′ are hydrogen and alkyl groups and may be the same or different groups and R² is a hydrogen, alkyl or alkoxy group. Such compounds may be polymerized to useful plastic materials or may be used in the preparation of still other novel compounds.

These novel pyran derivatives are conveniently produced by reacting 2-oxo-tetrahydropyran or a 3 and/or 6 alkyl substituted or unsubstituted 2-oxo-tetrahydropyran with an acetylenemagnesium halide or a monoalkyl or monoalkoxy acetylenemagnesium halide, hydrolyzing the resulting Grignard addition product to produce the corresponding 2-hydroxy-2-ethynyl, alkylethynyl or alkoxyethynyl tetrahydropyran (I), reacting the resulting product with a dehydrating agent to produce the corresponding 5,6-dihydro-4H-pyran (II) and subsequently hydrogenating said compound to the corresponding 5,6-dihydro-2-vinyl-4H-pyran, 5,6-dihydro-2-alkylvinyl-4H-pyran or 5,6-dihydro - 2 - alkoxyvinyl-4H-pyran (III), said compounds having hydrogen or alkyl substituents in one or both of the 3 and 6 positions. This sequence of reactions may be represented as follows:

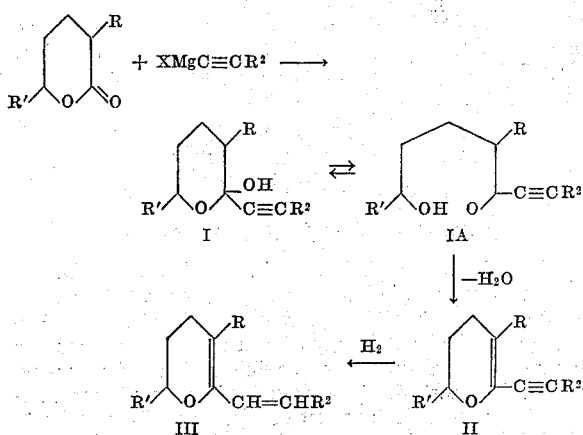

wherein R and R′ are hydrogen and alkyl groups and may be the same or different groups, R² is a hydrogen, alkyl or alkoxy group and X is a halogen.

In the first step of this overall process the reaction of 2-oxo-3 and/or 6 hydrogen or alkyl tetrahydropyran with an acetylene magnesium halide or an alkyl or alkoxy acetylenemagnesium halide is conveniently accomplished in the presence of an inert anhydrous solvent. Specific examples of suitable inert anhydrous solvents in which this reaction can be performed are ether, tetrahydrofuran and tetrahydropyran. The reaction is readily effected at normal temperatures although both lower and higher temperatures are also satisfactory. At the usual temperatures, complete reaction is generally achieved in a relatively short time, no more than one hour ordinarily being required. Although varying amounts of reactants can be employed it has been found advantageous to effect the reaction using at least equimolar quantities of reactants or an excess of the pyran starting material. Under such conditions two equivalents of the acetylene Grignard reagent are prevented from reacting with each equivalent of pyran. After the reaction has gone to completion and the corresponding Grignard addition product has formed it may be hydrolyzed to the corresponding 2-hydroxy compound by the addition of dilute acid to the reaction mixture. The desired 2-hydroxy-2-ethynyl, alkylethynyl or alkoxyethynyl tetrahydropyran forms quickly and may be recovered by separating the organic solvent layer and evaporating under diminished pressure until a solvent-free oily residue is obtained. The product may then be purified by conventional procedures such as distillation of the residue under reduced pressure.

The products produced according to this reaction in all probability consist of a mixture of compounds I and IA in a state of tautomeric equilibrium. However, from subsequent reactions it is seen that the existence of the pyran structure is favored and, to avoid unnecessary repetition herein, these compounds are referred to only according to the pyran structure.

In the practice of this invention 2-oxo tetrahydropyran or 3 and/or 6 alkyl substituted or unsubstituted 2-oxo-tetrahydropyrans may be used as starting materials. In this regard however, the processes of this invention are most readily effected and the products obtained are especially useful when the alkyl substituent of such compounds is a lower alkyl group. Such starting materials may be conveniently produced according to methods known in the art, one such method being disclosed in Ber. 34, 809 (1919). Examples of specific compounds which may be used in this invention are 2-oxo-tetrahydropyran, 2-oxo-6-methyl tetrahydropyran, 2-oxo-3,6-dimethyl tetrahydropyran, 2-oxo-3,6-diethyl tetrahydropyran, 2-oxo-6-propyl tetrahydropyran and the like.

The reaction of the present invention may be achieved using any acetylene or alkylacetylene or alkoxyacetylene magnesium halide. However the alkylacetylene magnesium halides in which the alkyl substituent is a lower alkyl are particularly reactive in this process. Examples of some of the acetylene Grignard reagents that are suitable for use in this invention which might be mentioned are acetylene magnesium bromide, acetylene magnesium chloride, methylacetylene magnesium bromide, ethylacetylene magnesium bromide, propylacetylene magnesium chloride and butylacetylene magnesium chloride and ethoxyacetylene magnesium bromide.

In a specific illustration of the described reaction 2-hydroxy-2-ethynyl-6-methyl tetrahydropyran is produced by reacting 2-oxo-6-methyl tetrahydropyran with acetylene magnesium bromide in ether at room temperature and hydrolyzing the intermediate Grignard addition product. Examples of other similar pyran derivatives which are prepared in this manner from the appropriate starting materials are 2-hydroxy-2-ethynyl tetrahydropyran, 2- hydroxy-2-ethynyl-3,6-dimethyl tetrahydropyran, 2-hydroxy-2-methylethynyl-6-methyl tetrahydropyran, 2-hydroxy-2-propylethynyl-3,6-diethyl tetrahydropyran, 2-hydroxy-2-ethoxyethynyl-3,6-dimethyl tetrahydropyran and the like.

In the second step of the overall process the 3 and/or 6 alkyl substituted or unsubstituted 2-hydroxy-2-ethynyl, alkylethynyl or alkoxyethynyl tetrahydropyrans are converted to the corresponding 5,6-dihydro-4H compounds by dehydration. This dehydration may be conveniently accomplished at elevated temperatures such as from about 100–150° C. and preferably in the presence of a dehydrating catalyst such as potassium acid sulfate, sodium acid sulfate, silica, organic sulfonic acids and the like. While effecting the dehydration it is advantageous to add a small amount of an antioxidant such as hydroquinone to prevent polymerization of the resulting product. After the dehydration has been completed the product may be recovered by conventional procedures such as distillation and extraction.

Representative of the compounds which are prepared in this manner from the appropriate precursors are 5,6-dihydro-2-ethynyl-4H-pyran, 5,6-dihydro-2-ethynyl-6-methyl-4H pyran, 5,6-dihydro-2-ethynyl-3,6-dimethyl-4H-pyran, 5,6-dihydro-2-methyl ethynyl-6-methyl-4H-pyran, 5,6-dihydro-2-propylethynyl-3,6-diethyl-4H-pyran, 5,6-dihydro-2-ethoxyethynyl-3,6-dimethyl-4H-pyran and the like.

In the last step of the overall process the 5,6-dihydro-2-ethynyl, 2-alkylethynyl or 2-alkoxyethynyl-4H-pyrans are selectively reduced to the corresponding 5,6-dihydro-2-vinyl, alkylvinyl or alkoxyvinyl-4H-pyrans by reaction with hydrogen in the presence of a hydrogenation catalyst. This hydrogenation may be readily achieved at room temperature in an inert organic solvent using such catalysts as nickel, palladium, platinum and the like. Although ordinary or subatmospheric pressures may be used to effect the reaction, best results are generally obtained at elevated pressures such as about 3 atmospheres. After the absorption of hydrogen has been completed the mixture is filtered, the solvent removed and the product purified by distillation under reduced pressure.

Some examples of compounds which are produced according to this procedure from the appropriate 2-ethynyl or 2-alkylethynyl compound are 5,6-dihydro-2-vinyl-4H-pyran, 5,6-dihydro-2-vinyl-6-methyl-4H-pyran, 5,6-dihydro-2-vinyl-3,6-dimethyl-4H-pyran, 5,6-dihydro-2-methylvinyl-6-methyl-4H-pyran, 5,6-dihydro-2-propylvinyl-3,6-diethyl-4H-pyran, 5,6-dihydro-2-ethoxyvinyl-3,6-dimethyl-4H-pyran.

According to a further embodiment of this invention the 3 and/or 6 alkyl substituted or unsubstituted 5,6-dihydro-2-vinyl, alkylvinyl or alkoxyvinyl-4H-pyrans may be converted to plastic materials by polymerization with a strong mineral or organic acid. Some suitable acids which may be used to effect the polymerization are hydrochloric acid, sulfuric acid and trichloroacetic acid. This reaction proceeds at room temperature but may be enhanced by the use of elevated temperatures. The resulting polymers formed in this way are thermoplastic transparent solids and may be used alone or with other plastic materials in the production of synthetic fibers, laminated materials, coating agents, containers and other useful plastic objects.

The following examples describing specific embodiments of this invention are included to illustrate but not limit the invention.

EXAMPLE 1

2-hydroxy-2-ethylnyl-6-methyl tetrahydropyran

Approximately 1.5 moles of 2-oxo-6-methyl-tetrahydropyran, prepared according to the procedure in Ann. 216, 134 (1882), in 0.5 liter of tetrahydrofuran is combined with a solution of 1 mole of acetylene magnesium bromide in 1 liter of tetrahydrofuran. The mixture is stirred for 15 minutes and poured into a mixture of ice and water containing a small amount of hydrochloric acid. After thoroughly mixing, the layer of tetrahydrofuran is separated and the solvent evaporated. The residue is then distilled and the 2-hydroxy-2-ethynyl-6-methyl tetrahydropyran collected.

5,6-dihydro-6-methyl-2-ethynyl-4H-pyran

The 2-hydroxy-2-ethynyl-6-methyl-tetrahydropyran prepared as above is added slowly to a distilling flask at 125° C. containing about 1 gm. of sodium acid sulfate. The 5,6-dihydro-6-methyl-2-ethynyl-4H-pyran which forms is immediately distilled and collected over aqueous sodium bicarbonate. The aqueous layer is separated and the product purified by distillation.

5,6-dihydro-2-vinyl-6-methyl-4H-pyran

About 250 mg. of 2% palladium on barium carbonate is added to 15 gm. of 5,6-dihydro-6-methyl-2-ethynyl-4H-pyran in 200 ml. of tetrahydrofuran. Hydrogen is bubbled through the mixture slowly until the absorption is complete. The mixture is filtered to remove the catalyst and distilled to isolate 5,6-dihydro-2-vinyl-6-methyl-4H-pyran.

EXAMPLE 2

2-hydroxy-2-ethynyl-3,6-dimethyl tetrahydropyran

Acetylene is passed over a stirred solution of one mole of ethyl magnesium bromide in one liter of ether at a pressure of about 15 pounds per square inch. A heavy precipitate forms which changes to a viscous oil in about one hour. The flow of acetylene is continued for 9 hours. To this ether solution of acetylene magnesium bromide is added rapidly 38.4 gm. of 2-oxo-3,6-dimethyl-tetrahydropyran in 200 ml. of ether without releasing the pressure. The mixture becomes viscous and stirring difficult. Following 10 minutes stirring, the pressure is released and a solution of 28.5 ml. of concentrated sulfuric acid in a mixture of ice and water is added with mixing. The ether layer is separated and the aqueous layer extracted with ether. The combined ether solutions are dried over sodium sulfate, filtered and the solvent evaporated under reduced pressure. The residue of 2-hydroxy-2-ethynyl-3,6-dimethyl tetrahydropyran is purified by distillation under diminished pressure; B. P. 67° C. at 2.5 mm., $n_D^{25}=1.4628$.

This reaction is repeated using tetrahydrofuran or tetrahydropyran as solvents with results equally as successful.

5,6-dihydro-2-ethynyl-3,6-dimethyl-4H-pyran

Approximately 14 gm. of 2-hydroxy-2-ethynyl-3,6-dimethyl tetrahydropyran is added to a flask containing 10 mg. of hydroquinone and 200 mg. of fused potassium acid sulfate at 130–135° C. and 10 mm. pressure. The rate of addition is about equal to the rate of distillation. The distillate is collected in 100 ml. of ether and washed with aqueous potassium hydroxide. The ether layer is separated, washed with water and the solvent removed leaving 5,6-dihydro-2-ethynyl-3,6-dimethyl-4H-pyran. This product is purified by distillation; B. P. 67° C. at 10 mm.; $n_D^{23}=1.4900$; max. 2370 A. (E%=686).

5,6-dihydro-2-vinyl-3,6-dimethyl-4H-pyran

About 100 mg. of 2% palladium on barium carbonate is added to a solution of 6.6 gm. of 5,6-dihydro-2-ethynyl-3,6-dimethyl-4H-pyran in 50 ml. of ether. Hydrogen is added to the mixture at about 40 pounds per square inch pressure with shaking until no further hydrogen is absorbed. The pressure is released, the mixture filtered and the product consisting of 5,6-dihydro-2-vinyl-3,6-dimethyl-4H-pyran isolated and purified by fractional distillation, B. P. 76° C. at 22 mm.; $n_D^{25}=1.4865$; max. 2540 A. (E%=745).

What is claimed is:
1. A compound having the formula

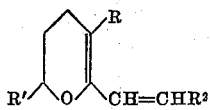

and polymers thereof, wherein R and R' are members of the group consisting of hydrogen and lower alkyl radicals and R² is a member of the group consisting of hydrogen, lower alkyl and lower alkoxy groups.
2. 5,6-dihydro-2-vinyl-4H-pyran.
3. 5,6-dihydro-2-vinyl-3,6-dimethyl-4H-pyran.
4. 5,6-dihydro-2-vinyl-6-methyl-4H-pyran.
5. 5,6-dihydro-2-methylvinyl-3,6-dimethyl-4H-pyran.
6. A compound having the formula

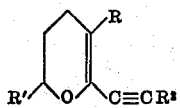

wherein R and R' are members of the group consisting of hydrogen and lower alkyl radicals and R² is a member of the group consisting of hydrogen, lower alkyl and lower alkoxy radicals.

References Cited in the file of this patent

UNITED STATES PATENTS 2,452,977    Williams et al. _____ Nov. 2, 1948

OTHER REFERENCES

Kharasch et al.: "Grignard Reac. of Nonmetallic Sub.," pages 574–8, Prentice-Hall (1954).
Rupe et al.: Helv. Chim. Acta, 12, pages 1133–41 (1929).
Karrer: "Organic Chemistry," page 75 (1946), Elsevier Pub. Co., New York.
Ducasse: Bull. Soc. Chim. (5), 11, 333–6 (1944).
Delepine et al.: Compt. rendu, 212, 1017–1018 (1941).
Chem. Abst., vol. 45, column 7569 (1951).